United States Patent [19]

Tanaka et al.

[11] Patent Number: 5,800,606
[45] Date of Patent: Sep. 1, 1998

[54] ULTRAFINE REACTIVE SILICA PARTICLES, SUSPENSION CONTAINING THE SAME, AND HARD COATING COMPOSITION

[75] Inventors: Seiichiro Tanaka; Hanako Kato; Takeshi Sawai, all of Kitakyushu; Nobuyuki Matsuzoe, Tokyo, all of Japan

[73] Assignee: Mitsubishi Chemical Corporation, Tokyo, Japan

[21] Appl. No.: 652,479

[22] PCT Filed: Dec. 21, 1994

[86] PCT No.: PCT/JP94/02169

§ 371 Date: Jul. 12, 1996

§ 102(e) Date: Jul. 12, 1996

[87] PCT Pub. No.: WO95/17349

PCT Pub. Date: Jun. 29, 1995

[30] Foreign Application Priority Data

Dec. 21, 1993 [JP] Japan ................................. 5-322249
Sep. 29, 1994 [JP] Japan ................................. 6-235364

[51] Int. Cl.[6] ........................................................ C09D 1/00
[52] U.S. Cl. ........................ 106/287.16; 423/338; 423/339
[58] Field of Search ....................... 106/287.16; 423/338, 423/339

[56] References Cited

U.S. PATENT DOCUMENTS 5,011,669  4/1991  Tsuchiya et al. ......................... 423/338

FOREIGN PATENT DOCUMENTS 33 888     11/1966  Germany.
2199817    7/1988   United Kingdom.

OTHER PUBLICATIONS

CA 94:161236, Yamane, "Gelling of silicon methoxide solution", 1980.

CA 110:119944, Ziemath et al., "Light scattering of silica monodisperse microspheres", 1988.

Database WPI, Derwent Publications, AN 83-841316, JP-A-58 189 263, (Nov. 4, 1983).

Database WPI, Derwent Publications, AN 93-261870, JP-A-05 179 201, (Jul. 20, 1993).

Database WPI, Derwent Publications, AN 93-148965, JP-A-05 085 714, (Apr. 6, 1993).

Database WPI, Derwent Publications, AN 89-344255, JP-A-01 256 576, (Oct. 13, 1989).

*Primary Examiner*—David Brunsman
*Attorney, Agent, or Firm*—Oblon, Spivak, McClelland, Maier & Neustadt, P.C.

[57] ABSTRACT

A suspension containing a novel reactive ultrafine particulate silica having a radius of gyration of at most 10 Å, has an excellent storage stability, and provides excellent various properties as a hard coating composition.

20 Claims, 9 Drawing Sheets

ULTRAFINE REACTIVE SILICA PARTICLES, SUSPENSION CONTAINING THE SAME, AND HARD COATING COMPOSITION

TECHNICAL FIELD

The present invention relates to a reactive ultrafine particulate silica, a suspension containing the same and a hard coating composition.

BACKGROUND ART

A resin coating, a silicone coating or an inorganic coating is used as a means for forming a hard thin film on glass, resin or metal surface for preventing occurrence of scratches, invasion by various chemicals and permeation of water, air and other gases.

Among these coating materials, a resin thin film is flexible but is easily damaged. A silicone thin film is water-repellent but is easily damaged. On the other hand, an inorganic thin film is hardly damaged but is breakable and it is difficult to form a uniform thin film.

Particularly, a tetraethoxysilane oligomer is used as an inorganic type hard coating composition, but the hardness of its thin film is insufficient and the storage stability as a hard coating composition is unsatisfactory and it is difficult to effect mass production.

DISCLOSURE OF INVENTION

The present inventors have studied and discovered as the result of the study that a composition obtained by blending tetramethoxysilane with water has a satisfactory storage stability and provides a very thin coating film excellent in hardness and flexibility, and that a reactive ultrafine particulate silica having a radius of gyration of at most 10 Å can be obtained by hydrolysis condensation of tetramethoxysilane and a suspension containing the reactive ultrafine particulate silica provides a hard coating composition having excellent properties.

Thus, the essential feature of the present invention resides in a reactive ultrafine particulate silica, a suspension containing the same and a hard coating composition obtained by blending tetramethoxysilane with water.

DETAILED DESCRIPTION OF THE INVENTION

Figure 1:
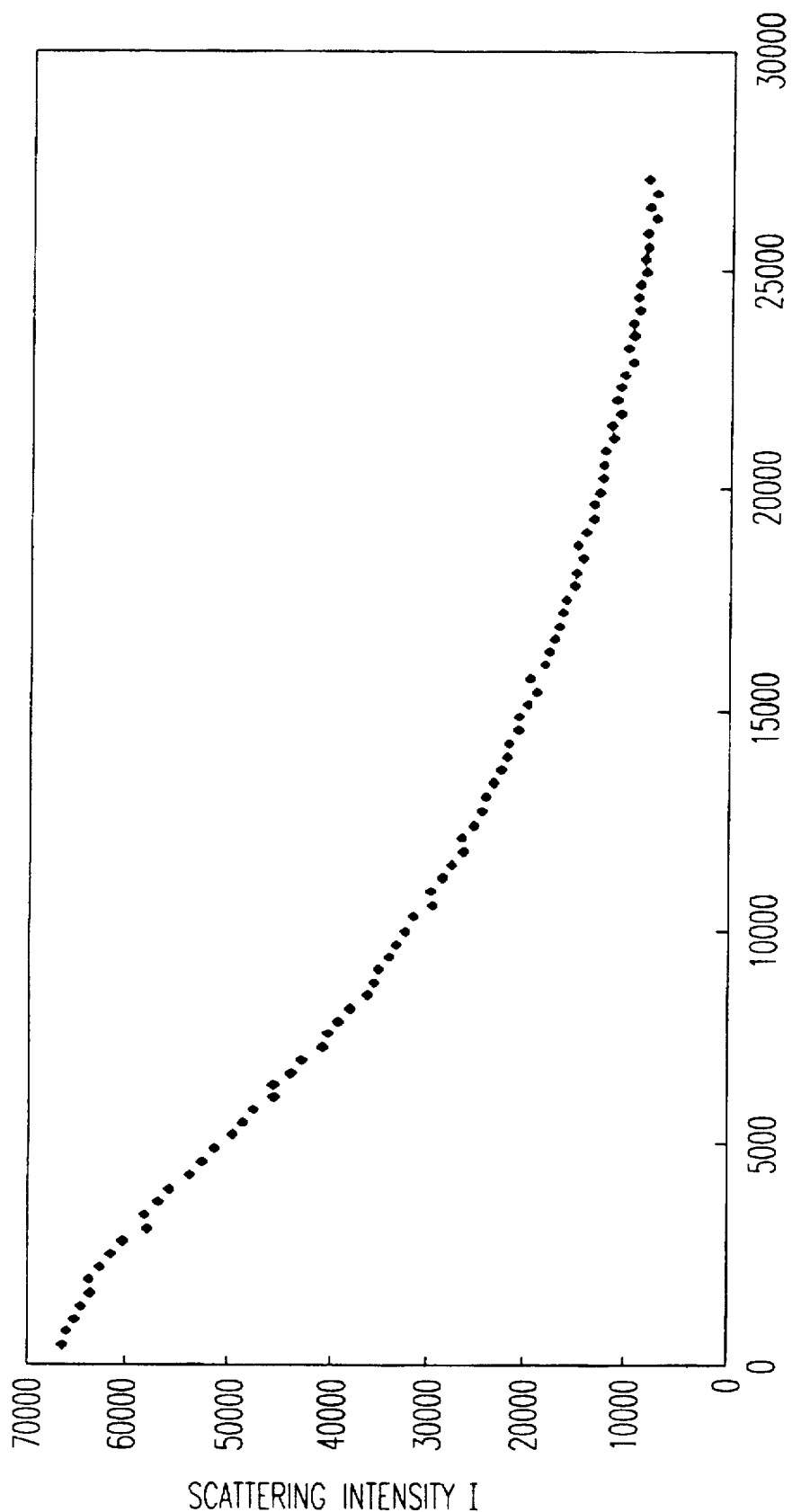
FIG. 1 shows measurement data of scattering intensity of composition A obtained in Example 1 illustrating one example of a suspension of the present invention.

The present invention is described hereinafter in details.

The hard coating composition of the present invention is a hard coating composition obtained by blending tetramethoxysilane with water. Thus, in the present invention, a tetramethoxysilane is used as an alkoxysilane. The tetramethoxysilane used in the present invention is a monomer ($Si(OCH_3)_4$) obtained by such a process as reaction of silicon tetrachloride and methanol or reaction of metallic silicon and methanol and/or an oligomer which is a partly hydrolyzed condensate of these monomers. Since impurities can be easily removed by purifying this starting material and this material does not by-produce hydrochloric acid which is liable to corrode an apparatus, it is preferable to employ a monomer of tetramethoxysilane obtained by reacting silicon and methanol and/or its oligomer particularly for use which requires removal of impurities.

It is indicated that a tetramethoxysilane monomer is remarkably poisonous and attacks cornea of eyes and even its vapor brings damages. Also, since it is highly active, it sometimes generates heat and causes bumping during operation. Further, a hard coating composition containing a large amount of the tetramethoxysilane monomer is liable to gradually degrade its properties.

In this regard, it is possible to attend to these problems by employing an oligomer of tetramethoxysilane (hereinafter referred to as "tetramethoxysilane oligomer"), and the tetramethoxysilane oligomer provides a hard coating composition having excellent coating properties for a long term, reducing the toxicity and also excellent in workability.

Hydrolysis reaction for obtaining a tetramethoxysilane oligomer can be conducted in accordance with a known method, and can be conducted for example by adding a predetermined amount of water to the above-mentioned tetramethoxysilane monomer and reacting in the presence of an acid catalyst usually at a temperature of from room temperature to 100° C. while distilling off a by-produced alcohol. By this reaction, methoxysilane is hydrolyzed, and a liquid-like tetramethoxysilane oligomer (usually having an average polymerization degree of from 2 to 8, mostly from 3 to 7) having at least 2 hydroxyl groups can be obtained by condensation reaction as a partly hydrolyzed condensate. The degree of hydrolysis can be controlled adequately by the amount of water used, and in the present invention, the degree of hydrolysis is selected usually in the range of from 20 to 80% preferably from 30 to 60%. If the degree of hydrolysis is less than 20%, the remaining ratio of the monomer is too high and the productivity is low. On the other hand, if the degree of hydrolysis is more than 80%, a hard coating composition prepared therefrom is liable to gel. The degree of hydrolysis of 100% means the case wherein water is added in a theoretical amount required for hydrolysis-condensating all of hydrolyzable groups of tetramethoxysilane, i.e. in an amount of ½ mol number of water to mol number of a methoxy group.

The tetramethoxysilane oligomer thus obtained contains a monomer usually in an amount of from 2 to 10%. Since a hard coating composition containing this amount of monomer has a poor storage stability, it is preferable to remove the monomer so as to reduce the monomer content to at most 1 wt %, preferably at most 0.3 wt %. The removal of this monomer can be conducted by flash distillation, vacuum distillation or blowing of an inert gas.

In the present invention, water is blended with the above-mentioned tetramethoxysilane. In this case, when water is blended in an excess amount larger than an amount capable of effecting 100% hydrolysis condensation of tetramethoxysilane (hereinafter referred to as "hydrolysis 100% equivalent"), i.e. In an excess amount larger than an amount required for hydrolysis-condensing all of hydrolysis-condensable groups i.e. methoxy groups of tetramethoxysilane, the following reactive ultrafine particulate silica can be formed and a hard coating composition producing a hard coating film having excellent properties can be preferably provided. This is also the same with regard to the case of using a tetramethoxysilane oligomer, and it is preferable to blend water in an excess amount larger than an amount required for hydrolysis-condensing the remaining methoxy groups.

In this manner, the amount of water may be any amount so long as it exceeds "hydrolysis 100 equivalent" amount, but it is practical to use water in an amount of from 1 to 4 times, preferably from 1 to 2 times, most preferably from 1 to 1.5 times larger than the hydrolysis 100% equivalent amount. If the amount of water is too excessive, the storage stability of a hard coating composition becomes poor. On the other hand, if the amount of water is smaller than the hydrolysis 100% equivalent amount, the formation of the following reactive ultrafine particulate silica becomes unsatisfactory and the hardness of a hard coating film tends to be poor.

Water to be employed is not specially limited and a city water may be employed, but it is sometimes preferable to employ a dechlorinated water or an extrapure water depending on an object or a use. Thus, the water is optionally selected. For example, it is preferable to employ a dechlorinated water when it is used for a substrate such as mild steel, copper or aluminum, an electronic substrate such as a barrier film including a heat-resistant film, a moisture-resistant film or a chemical-resistant film, or an electric insulating film, which is easily corroded with an acid and it is preferable to employ an extrapure water when it is used for semiconductors which require to prevent incorporation of impurities.

In the present invention, a diluent can be further added. By the addition of a diluent, a hard coating composition obtained thereby improves storage stability.

As the diluent, water or an organic solvent can be used depending on its object. When water is employed, the dilution may be effected by increasing the above-mentioned blending amount of water, or a hydrolysis condensate of tetramethoxysilane obtained by blending the above-mentioned amount of water may further be diluted with an optional amount of water.

Also, examples of the organic solvent include alcohols, glycol derivatives, hydrocarbons, esters, ketones, ethers and the like, and one component or a mixture of two or more component may be used.

Examples of the alcohols include methanol, ethanol, isopropylalcohol, n-butanol, isobutanol, octanol, n-propylalcohol, acetylacetone alcohol and the like, and examples of the glycol derivatives include ethylene glycol, ethyl glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, propylene glycol monomethyl ether, propylene glycol monoethyl ether, propylene glycol monobutyl ether, ethylene glycol monoethyl ether acetate, ethylene glycol monomethyl ether acetate, propylene glycol monoethyl ether acetate, propylene glycol monomethyl ether acetate and the like.

Examples of the hydrocarbons include benzene, kerosine, toluene, xylene and the like, and examples of the esters include methyl acetate, ethyl acetate, butyl acetate, methylacetoacetate, ethylacetoacetate and the like. Examples of the ketones include acetone, methyl ethyl ketone, methyl isobutyl ketone, acetyl acetone and the like, and examples of the ethers include ethyl ether, butyl ether, methyl cellosolve, ethyl cellosolve, dioxane, furan, tetrahydrofuran and the like.

Among these solvents, alcohols, particularly a $C_1$–$C_4$ alcohol such as methanol, ethanol, isopropanol or butanol, are preferable since they are easy to handle and provide a satisfactory storage stability in solution and provide a coating film having excellent properties. Further, among these solvents, by using methanol or ethanol, an extremely hard coating film can be easily obtained.

Also, when an organic solvent such as an alcohol is used as a diluent, the solvent is used in an amount of from 50 to 5000 parts by weight, preferably from 100 to 1000 parts by weight to 100 parts by weight of tetramethoxysilane. If the amount of the solvent is lower than 50 parts by weight, the storage stability of a coating solution is lowered, and is liable to gel. On the other hand, if the amount of the solvent exceeds 5000 parts by weight, the thickness of a coating film becomes extremely thin. A preferable concentration is from 35 to 1 wt %, more preferably from 26 to 5 wt %, in terms of silica concentration conversion in solution, to provide a hard coating composition having an excellent storage stability and to provide a hard coating of satisfactory hardness.

When water is used as a diluent, it is blended suitably in an amount of from 20 to 300 parts by weight (which is the total amount of the diluent amount and the above-mentioned hydrolysis 100% equivalent amount) to 100 parts by weight of tetramethoxysilane. When water is used as a diluent, gelation occurs more easily as compared with the case of using an organic solvent such as methanol or ethanol, and it is therefore preferable to prevent the gelation by maintaining a pH value of 3 or lower, preferably a pH value of from 1 to 2. Thus, depending on the type and amount of a catalyst used, the diluent is added in a preferable amount while maintaining the above pH value.

In the present invention, a curing catalyst may be added if desired.

Examples of the catalyst include inorganic acids such as hydrochloric acid, acetic acid, nitric acid, formic acid, sulfuric acid and phosphoric acid, organic acids such as formic acid, acetic acid, propionic acid, oxalic acid, para-toluenesulfonic acid, benzoic acid, phthalic acid and maleic acid, alkali catalysts such as potassium hydroxide, sodium hydroxide, calcium hydroxide and ammonia, organic metals, metal alkoxides, organic tin compounds such as dibutyl tin dilaurate, dibutyl tin dioctoate and dibutyl tin diacetate, metal chelate compounds such as aluminum tris (acetylacetonate), titanium tetrakis(acetylacetonate), titanium bis(butoxy)bis(acetylacetonate), titanium bis (isopropoxy)bis(acetylacetonate), zirconium tetrakis (acetylacetonate), zirconium bis(butoxy)bis (acetylacetonate) and zirconium bis(isopropoxy)bis (acetylacetonate) and boron compounds such as boron butoxide and boric acid. In order to provide a hard coating composition having a satisfactory storage stability and a coating film having properties of satisfactory hardness and flexibility, it is preferable to employ one or a mixture of two or more of an organic acid such as acetic acid, maleic acid, oxalic acid and fumaric acid, a metal chelate compound, a metal alkoxide and a boron compound.

Also, the type of a preferable catalyst can be selected optionally depending on the type of a diluent, a substrate to which a hard coating is applied, and its use.

For example, when a strong acid such as hydrochloric acid or nitric acid is used as a catalyst, a storage stability in solution is good and a time required for the following aging can be reduced, and a hard coating having an excellent hardness can be provided, but such a catalyst is not suitable for a substrate which is easily corroded. On the other hand, maleic acid is preferable since it does not cause corrosion problem and it can reduce relatively the aging time and provide a coating film having a satisfactory hardness and a particularly excellent storage stability in solution.

Also, when methanol or ethanol is used as a diluent, a satisfactory storage stability in solution can be maintained and a coating film having a satisfactory hardness can be obtained, even when in addition to the above-mentioned acid catalyst, a metal acetylacetonate compound such as aluminum tris(acetylacetonate), titanium tetrakis (acetylacetonate), titanium bis(butoxy)bis(acetylacetonate), titanium bis(isopropoxy)bis(acetylacetonate), zirconium tetrakis(acetylacetonate), zirconium bis(butoxy)bis (acetylacetonate) and zirconium bis(isopropoxy)bis (acetylacetonate), is used.

The amount of such a catalyst component is not specially limited so long as it achieves a catalyst function, but is generally selected from the range of from 0.1 to 10 parts by weight, preferably from 0.5 to 5 parts by weight to 100 parts by weight of tetramethoxysilane.

A method for blending these components is not specially limited, and a solution having the catalyst component previously dissolved in water may be used or a catalyst component may be blended while stirring to obtain a more homogeneous blend. Also, if a catalyst which is easily decomposable with water or other solvents is used, it is preferable to blend the catalyst with tetramethoxysilane in advance and then to blend the mixture with water or other solvents when it is actually used. Further, a catalyst component may be added to other components when it is used.

A blended solution obtained by blending these components is preferably subjected to aging.

Such an aging step is considered to satisfactorily proceed with hydrolysis of tetramethoxysilane and partial crosslinking reaction by condensation to form the following fine particles which provide a hard coating having excellent properties.

The aging of the blending solution can be conducted by allowing the solution to stand or by stirring the solution. The time allowed to stand the solution is a time sufficient for proceeding the above-mentioned partial crosslinking reaction to such a degree as to provide satisfactory film properties, and also depends on the type of a diluent and the type of a catalyst used. For example, when an organic solvent is used as a diluent, the aging time is about at least 1 hour at room temperature in the case of using hydrochloric acid, and is at least a few hours, preferably from 8 hours to 2 days in the case of using maleic acid.

Also, when water is used as a diluent, it is preferable to conduct hydrolysis for from 1 to 180 minutes, usually from 10 to 20 minutes under stirring while maintaining a pH value of at most 3, preferably a pH value of from 1 to 2. After obtaining a transparent solution in this manner, the solution is further allowed to stand for 1 to 2 hours.

The aging time is influenced also by environmental temperature, and it is sometimes preferable to heat the solution to around 20° C. at an extremely cold place. Generally, the aging proceeds rapidly at a high temperature, but a suitable heating temperature is at most 50° to 60° C. since the solution causes gelation when it is heated to 100° C. or higher.

By fully conducting the aging, whitening or peeling of a film obtained can be avoided. Generally, the aging is sufficient if the solution is allowed to cool to room temperature after heat-generation by hydrolysis is finished and is allowed to stand for a time required to finish partial crosslinking reaction. In the blending solution of the present invention thus aged (hereinafter referred to as "aged material"), fine particles having a radius of gyration of at most 10 Å (hereinafter referred to as "reactive ultrafine particulate silica") are formed, and the formation of reactive ultrafine particulate silica can be easily identified by means of a small angle X-ray scattering goniometer. Thus, the presence of fine particles provides a diffraction intensity distribution of incident X-ray which shows diffuse scattering called as central scattering in the incident line direction, i.e. small angle X-ray scattering. The scattering intensity I is provided by the following Guinier equation.

$$I = C_{exp}(H^2 Rg^2/3)$$

(I: scattering intensity, H: scattering vector ($2\pi \sin\theta/\lambda$), Rg: radius of gyration of fine particles, C: Const, $\lambda$: incident X-ray wavelength, $2\theta$: divergent angle)

If common logarithm is applied to both members of the above Guinier equation, it becomes as follows:

$$\log I = \log C - (H^2 Rg^2/3)$$

Thus, when fine particles are present, the radius of gyration of the fine particles can be determined by measuring scattering intensity, preparing log-log graph in respect to scattering vector and measuring inclination.

In the measurement of radius of gyration, a measurement error sometimes occurs to some degree, depending on the concentration of a solution to be measured. In order to be precise, the radius of gyration of the reactive ultrafine particulate silica of the present invention may be at most 10 Å even when measured at a silica conversion concentration of 0.3%. Particularly, when hydrolysis is conducted in the presence of an organic solvent such as ethanol as a diluent by adding water in an amount larger than hydrolysis 100% equivalent, the reactive ultrafine particulate silica thus obtained may have a radius of gyration of at most 6 Å and is extremely small, even when measured under the above-mentioned condition.

Also, the reactive ultrafine particulate silica of the present invention has a weight average molecular weight of from 1000 to 3000 measured by GPC in terms of standard polystyrene conversion. Also, many of them have a weight average molecular weight of about 1400 to 2000. The molecular weight of the reactive ultrafine particulate silica varies to some degree depending on the conditions of hydrolysis condensation conducted by adding water of hydrolysis 100% equivalent, particularly the presence or absence of a diluent and the type of the diluent. For example, when hydrolysis is conducted in the presence of an organic solvent such as alcohol as a diluent, a reactive ultrafine particulate silica having a weight average molecular weight of about 1600 to 1800 can be stably obtained.

(The above-mentioned molecular weight is a weight average molecular weight determined in terms of standard polystyrene conversion based on the measurement by GPC.)

As mentioned above, since the reactive ultrafine particulate silica of the present invention has an extremely small radius of gyration relative to its molecular weight, it is presumed to be a silica having an ultra-dense structure of specific unique form. Also, the reactive ultrafine particulate silica of the present invention has many hydrolysis-condensable reactive functional groups such as a hydroxyl group and an alkoxy group. For example, when hydrolysis is conducted in the presence of ethanol as a diluent by adding water of hydrolysis 100% equivalent, a reactive ultrafine particulate silica having a hydroxyl group, a methoxy group and an ethoxy group can be obtained due to alcohol exchange reaction. For example, a reactive ultrafine particulate silica having a hydroxyl group in an amount of 0.6 time or 0.7 time or at least 0.8 time mol to the total mol number of a methoxy group and an ethoxy group, or having an ethoxy group in an amount of 1.5 time or at least 2 time mols to the mol number of a methoxy group, can be easily obtained. Such a reactive ultrafine particulate silica of the present invention as having a large amount of various reactive functional groups is highly reactive, and a suspension containing the same provides a hard coating composition having a high crosslinking rate, which forms a hard coating having a high crosslinking density, a high hardness and other excellent properties. Also, even when hydrolysis is conducted in the absence of an organic solvent as a diluent, the reactive ultrafine particulate silica formed thereby has a large number of hydroxyl groups and methoxy groups. Thus, a suspension containing this reactive ultrafine particulate silica also provides a hard coating having excellent film properties including high hardness, and since this suspension does not substantially contain an organic solvent, this is suitably used in an environment where an organic solvent is not desired.

A suspension having the reactive ultrafine particulate silica of the present invention dispersed in water or other liquid is unexpectedly colorless and transparent and does not cause Tyndall phenomenon, and is a homogeneous liquid-like suspension having a viscosity of about 0.5 to 10 cps and its silica concentration can be made to 36 wt %. Moreover, this suspension is stable, and can be stored for at least 12 months at room temperature under sealed condition without causing any visual change.

By adding a suitable catalyst or solvent, a composition stable in a wide pH range from strongly acidic to strongly alkaline zone can be obtained.

As mentioned above, the suspension of the present invention can be obtained by aging a blending solution obtained by blending tetramethoxysilane with water. In a hard coating composition comprising the above obtained suspension of the present invention, tetramethoxysilane is subjected to hydrolysis condensation to form the above-mentioned reactive ultrafine particulate silica, and the hard coating composition provides excellent crosslinking reactivity at the time of film-forming and is curable even at normal temperature and film-formable outdoors. Also, by appropriately selecting tetramethoxysilane as a starting alkoxysilane, the amount of impurities such as chlorine can be easily made extremely low, e.g. at most 2 ppm of a chlorine amount, and therefore such a composition is suitable for use which must avoid corrosion problem of a substrate. Also, water or other various solvents or dispersion medium can be added to the above-mentioned suspension. Particularly when water is used as a diluent for obtaining a blending solution and a pH value is made at most 3, it is desirable to add these components for convenient use and to make the suspension a weak acid of a pH of about 3 to 5. In a state of a strong acid of a pH of at most 3, it is liable to cause a corrosion problem of a substrate, and it is inconvenient for practical use since it is hard to handle. Also, if the suspension is made neutral or alkaline, it is liable to gel and tends to cause a storage stability problem. When water is added as a diluent and water is further added after aging, the total amount of water blended is usually from 200 to 100,000 parts by weight, preferably from 350 to 35,000 parts by weight to 100 parts by weight of tetramethoxysilane. If the amount of water is less than 200 parts by weight, a hard coating composition obtained therefrom provides a poor storage stability, and a hard coating film obtained therefrom becomes too thick and tends to cause cracks. On the other hand, if the amount of water is more than 100,000 parts by weight, a coating obtained therefrom becomes extremely thin. Also, when an organic solvent such as alcohol is used as a diluent, a storage stability becomes more satisfactory since an OH concentration in the vicinity of fine particles becomes lower than in the case of using water as a diluent, and it can be used as it is as a hard coating composition after aging.

A hard coating composition of the present invention thus obtained is coated and forms a film on a substrate such as polymer, metal, paper, cloth, ceramics or wire by means of a film-forming method such as impregnating, spin-coating, dipping or spraying method.

Usually, in the film-formation, after coating a hard coating composition, a solvent is removed by allowing it to stand at room temperature for 1 to 10 minutes, and it is heated to proceed crosslinking reaction among respective components in solution by dehydration-condensation reaction, thereby curing the coating film, but a curing method is not limited to this manner and is appropriately selected optionally depending on its object.

For example, if the coating composition is directly heated without conducting the previous removal of a solvent at room temperature, a smooth coating surface can be obtained by optionally adding a defoaming agent, a leveling agent or other additives or by adding a solvent having an evaporation rate suitable for the use conditions including a curing temperature or the like. Also, the heating temperature is not specially limited, and a low temperature may be employed if a sufficient time is taken, and crosslinking can be proceeded usually at a temperature in the wide range of from −20° to 300° C., but practically in the range of from 20° to 200 C. A time required for curing depends on a catalyst used, and a hard coating having a satisfactory hardness can be obtained for a few minutes if the temperature is raised to about 150° C. in an efficient manner. Examples of a heating furnace include common furnaces such as a gas furnace and an electric furnace.

The hard coating composition of the present invention has a satisfactory storage stability in solution, and it can be allowed to stand for at least 2 weeks without increasing viscosity and a satisfactory film-formability can be maintained. A coating film having a satisfactory hardness after film-formation, e.g. a pencil hardness of at least 9H, can be easily obtained, and a coating film obtained therefrom has also a flexibility.

EXAMPLES

Hereinafter, the present invention is further illustrated by the following Examples. Part and % used herein mean part by weight and wt % unless otherwise specified.

Example 1
(Synthesis of tetramethoxysilane oligomer)
234 g of tetramethoxysilane and 74 g of methanol were placed and mixed in a 500 ml round bottom flask equipped with a stirrer, a reflux condenser and a thermometer, and 22.2 g of 0.05% hydrochloric acid was added thereto, and the resultant mixture was subjected to hydrolysis condensation reaction at an internal temperature of 65° C. for 2 hours.

Thereafter, the condenser was replaced by a distillation tube, and the internal temperature was raised to 130° C. to distill off methanol. In this manner, a partly hydrolyzed condensate was obtained (partial hydrolysis rate=40%). An oligomer having a polymerization degree of 2 to 8 was identified, and its weight average molecular weight was 550.

A monomer amount of the partially hydrolyzed condensate thus obtained (hereinafter referred to as "tetramethoxysilane oligomer") was 5%. The tetramethoxysilane oligomer was placed in a flask heated to 130° C., and a gasified monomer was taken out of the system, together with an inert gas, and the temperature was raised to 150° C. and maintained for 3 hours. After removing the monomer, the tetramethoxysilane oligomer thus obtained had a monomer amount of 0.2%.

(Preparation of hard coating composition)

62.42 g of ethanol, 6.50 g of water (corresponding to 113% hydrolysis ratio) and 0.31 g of maleic acid were blended with 30.77 g of the above obtained tetramethoxysilane oligomer, and the blend was stirred at room temperature for 30 minutes to obtain a colorless transparent homogeneous liquid-like hard coating composition (composition A, $SiO_2$ conversion concentration 16 wt %, 8.1 vol %). Further, the composition thus obtained was diluted with ethanol to about 4 times amount (composition B, $SiO_2$ conversion concentration 4.3 wt %, 2 vol %).

(Identification of fine particles)

The above prepared compositions A and B were maintained under sealed condition at room temperature for 4 days, and thereafter the compositions A and B were subjected to analysis by small angle scattering under the following conditions.

Measurement apparatus: Kratky Compact Camera manufactured by Anton Paar Co.

X-ray source: 50 kV, 300 mA, Cu-Kα ray was modified to be monocolor by Ni-filter.

Optical conditions: distance between sample and light-receiving slit=20 cm, internal vacuum path=19 cm, entrance slit=80 μm, light-receiving slit=200 μm, beam length=16 mm Sample cell: quartz capillary (diameter=about 1 mm, thickness=10 μm)

Other conditions: room temperature, step scan method operation range 2θ=0.086–8.1 deg 90 sec/point Data correction: background correction was effected by using scattering at the time of filling water into the quartz capillary. X-ray absorption correction was also made.

Analytical software: slit correction and inverse Fourier transformation were made by employing analytical software ITP-81 (O. Glatter; J. Appl. Cryst., 10. 415–421(1977)).

Figure 2:
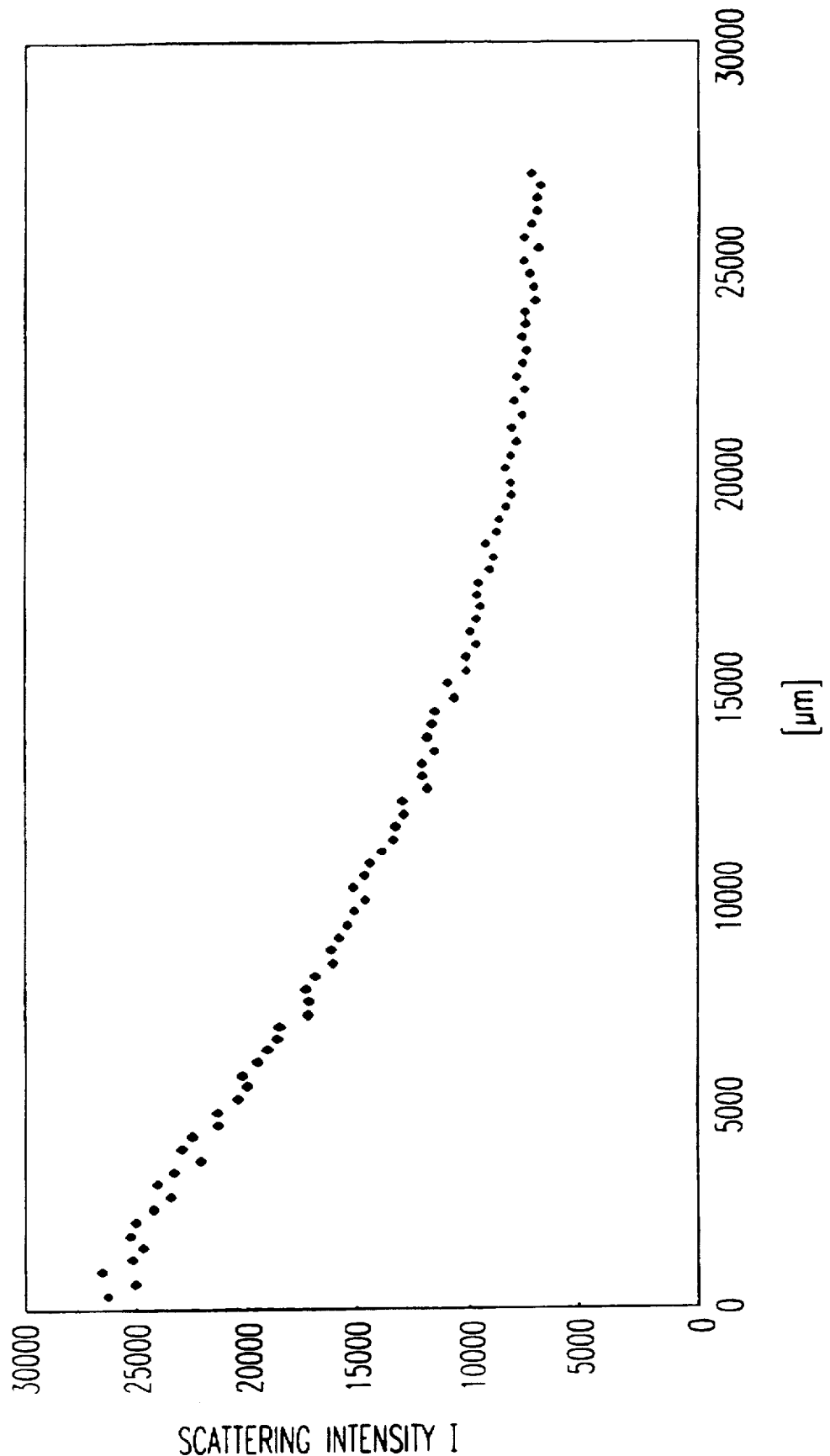
FIG. 2 shows measurement data of scattering intensity of composition B obtained in Example 1 illustrating another example of a suspension of the present invention.

FIG. 1 and FIG. 2 illustrate measurement data of scattering intensity to shifting distance of scattering X-ray by light-receiving slit respectively with regard to composition A and composition B (background correction and absorption correction were made).

Figure 3:
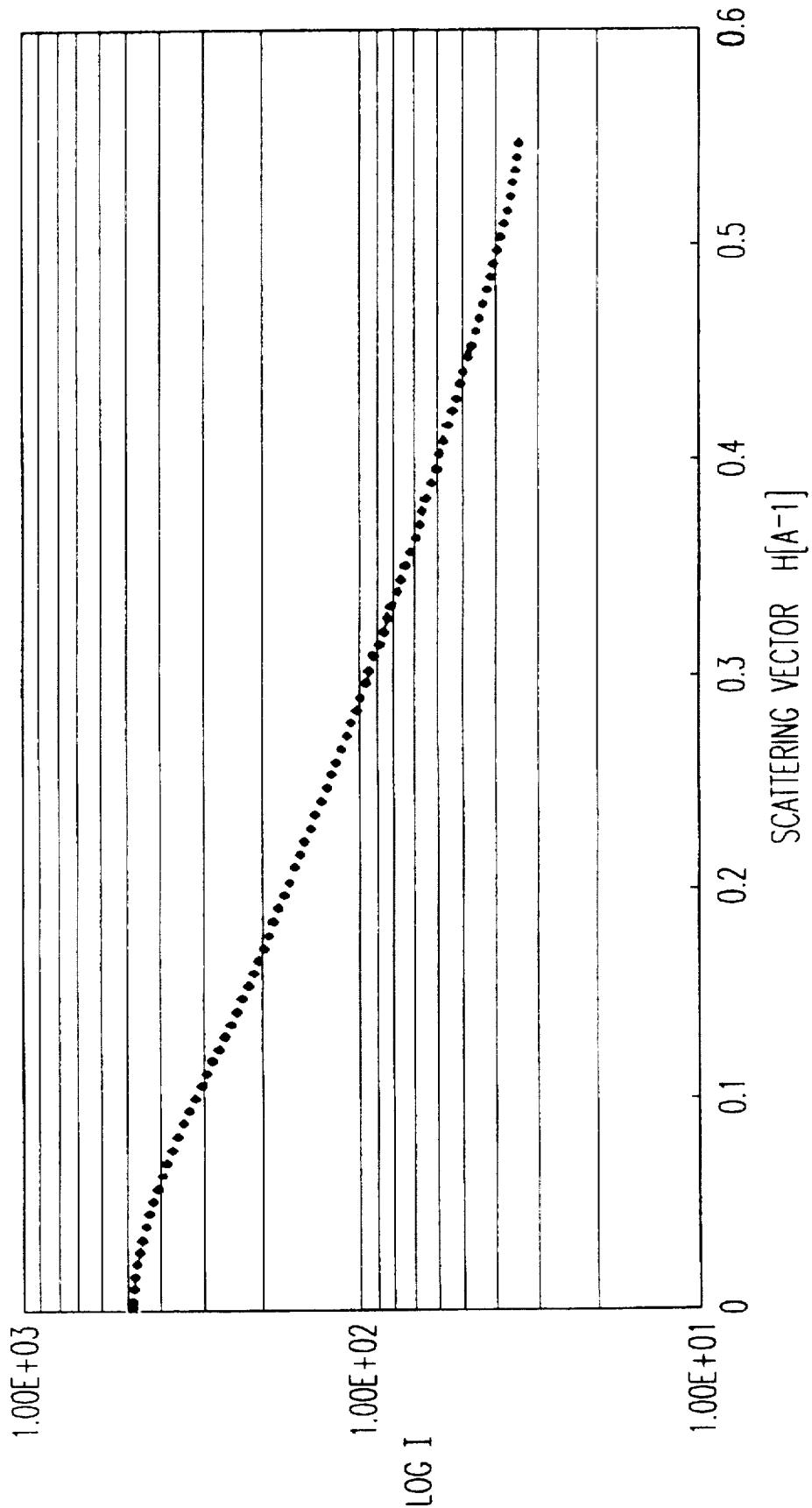
FIG. 3 shows point beam data after slit amendment of composition A.
Figure 4:
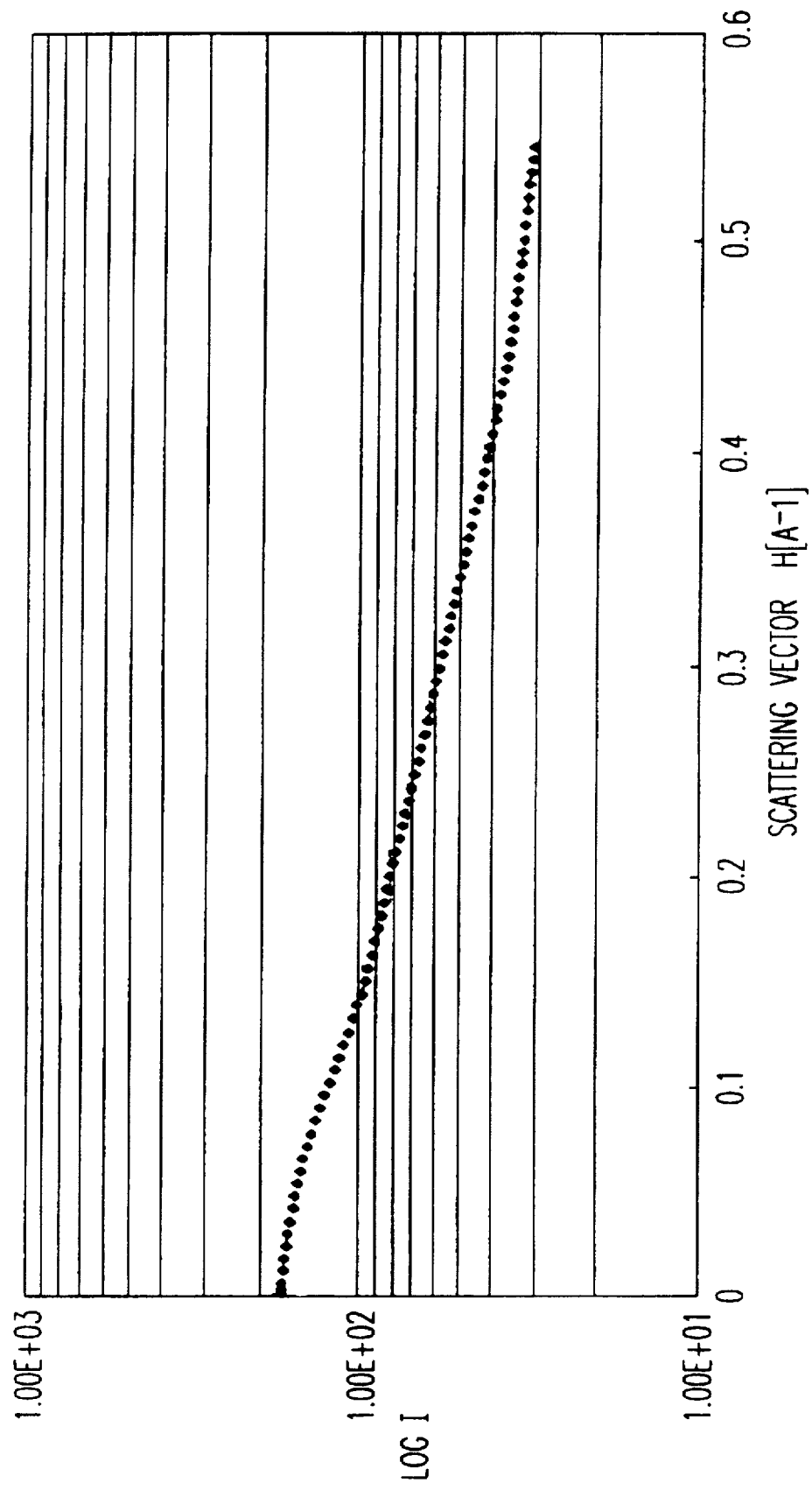
FIG. 4 shows point beam data after slit amendment of composition B.

FIG. 3 and FIG. 4 illustrate point beam data after slit correction respectively with regard to composition A and composition B.

Figure 5:
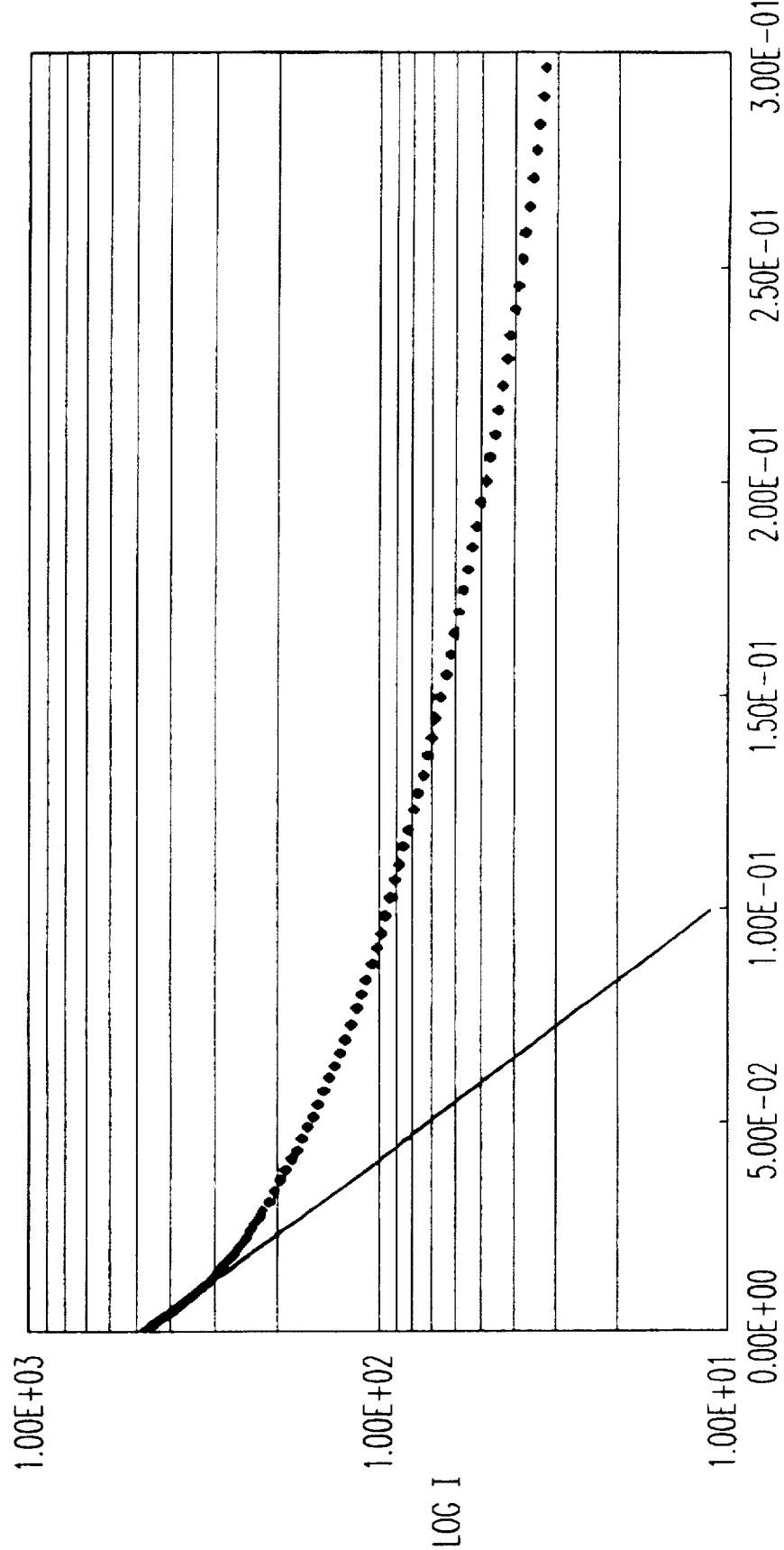
FIG. 5 shows distribution of radius of gyration of fine particles in composition A.
Figure 6:
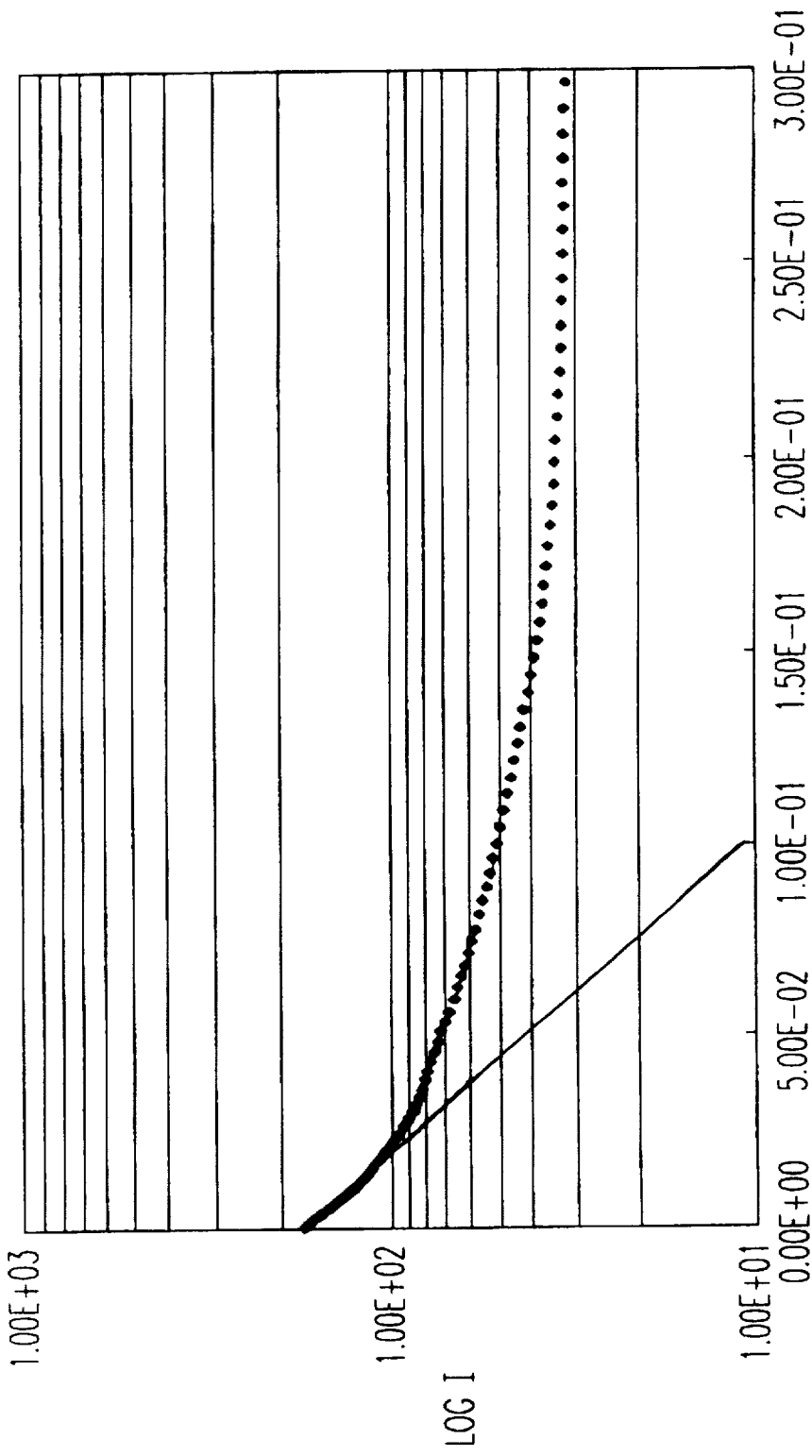
FIG. 6 shows distribution of radius of gyration of fine particles in composition B.
Figure 7:
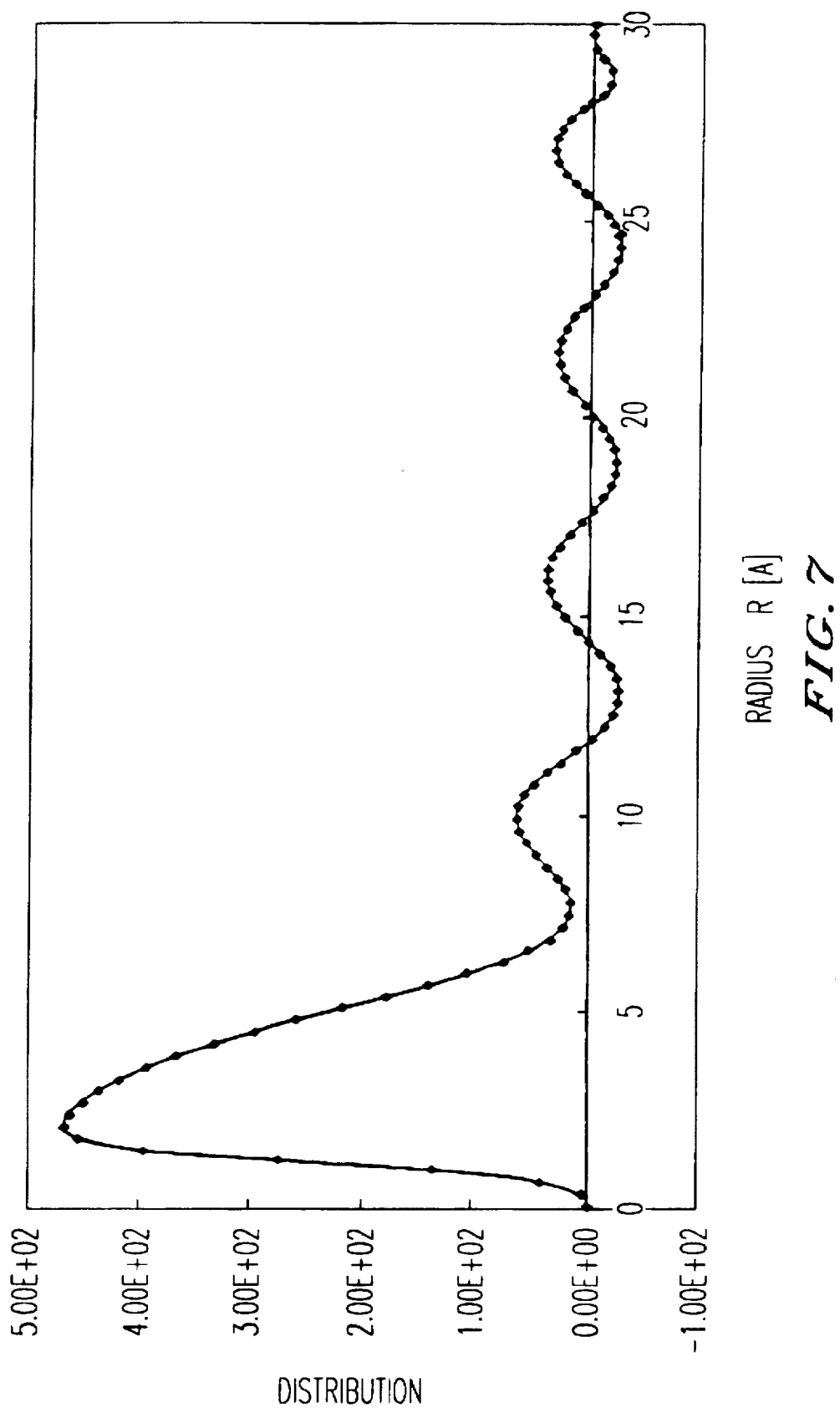
FIG. 7 shows distribution of sphere-assumed radius of fine particles in composition A.
Figure 8:
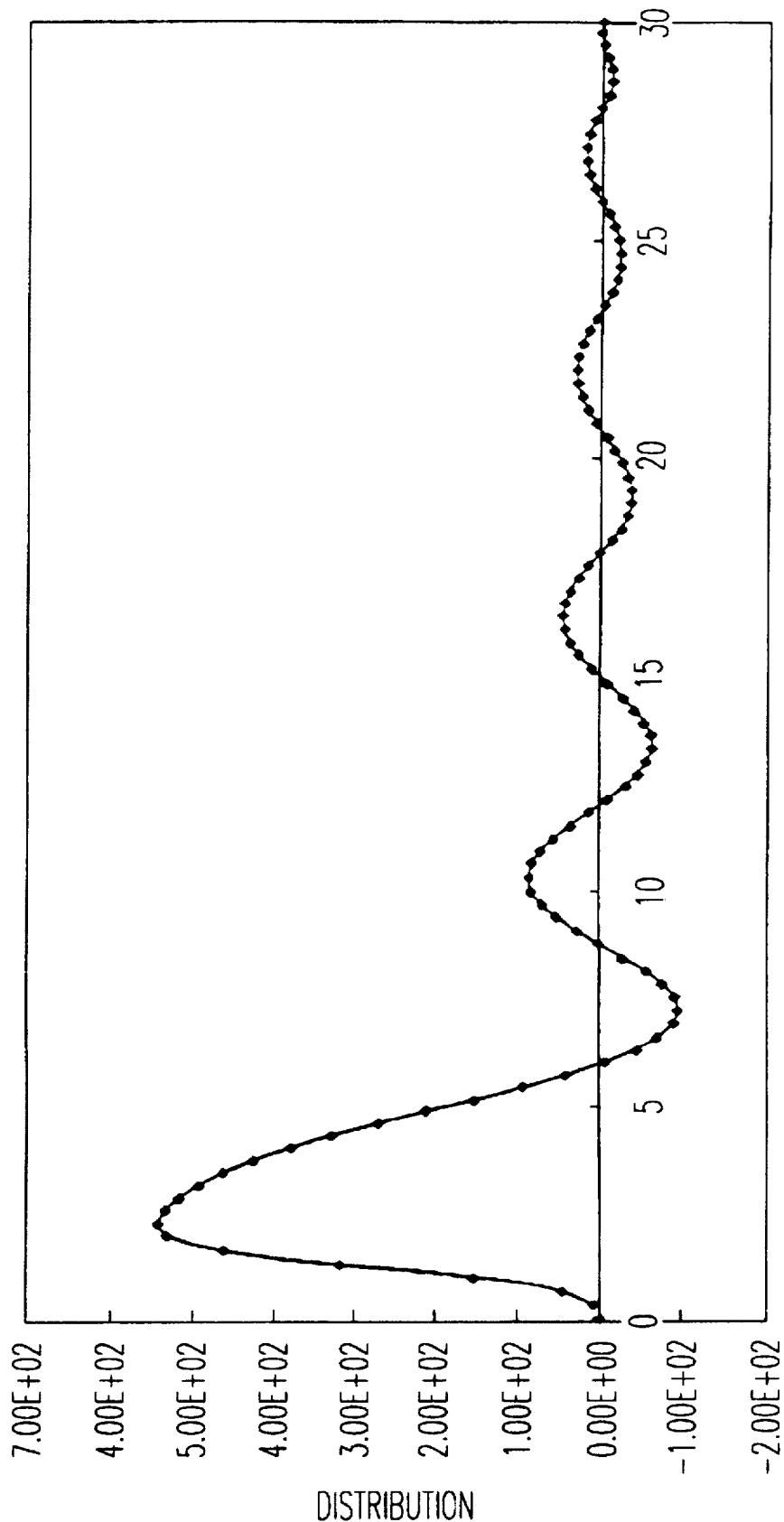
FIG. 8 shows distribution of sphere-assumed radius of fine particles in composition B.

From these FIG. 3 and FIG. 4, the maximum value of a radius of gyration was determined in accordance with Guinier equation, $I=C_{exp}(-H^2Rg^2/3)$ (I; scattering intensity, H: scattering vector $(=2\pi sin2\theta/\lambda)$, Rg: radius of gyration, C: Const, θ: Cu-Kα ray wavelength, 2θ; divergent angle), and the value of composition A was 7.0 Å (sphere-assumed radius=9.0 Å) and the value of composition B was 6.0 Å (sphere-assumed radius=7.7 Å according to real radius $R=(5/3)^{1/2}Rg$) as shown in FIG. 5 and FIG. 6. FIG. 3 and FIG. 4 were subjected to inverse Fourier transformation, and the results of radius (sphere-assumed) distribution are shown in FIG. 7 and FIG. 8. The maximum values of the radii were respectively about 6 Å and 7 Å.

(Measurement of molecular weight)

The measurement of the molecular weight of this hard coating composition (composition A) was conducted under the following conditions.

Degasifier: Shodex DEGAS (manufactured by Showa Denko K.K.)
Pump; Shimadzu LC6A (manufactured by Shimadzu Seisakusho K.K.)
Thermostat; manufactured by Nishio Kogyo K.K.
Column: Tosoh TSK-GEL for GPC
G-4000H, G-2000H, G-1000H (manufactured by Toyo Soda K.K.)
Detector; Shodex RI SE-51 (refraction index detector manufactured by Showa Denko K.K.)
Data collector: Shimadzu C-R3A (manufactured by Shimadzu Seisakusho K.K.)
Data treatment: Personal computer (PC-9801 system) Column temperature: 40° C.
Injection temperature: room temperature
Pump temperature: room temperature
Solvent: tetrahydrofuran, 1.0 ml/minute
Molecular weight calculation method: standard polystyrene conversion Results are shown in the following Table:

| No. | (Peak) | (Molecular weight) | Number average M.W. (Mn) | Weight average M.W. (Mw) | Mw/Mn | Area (%) |
|---|---|---|---|---|---|---|
| 1 | 22.62 min. | 816 | 1327 | 1704 | 1.28 | −73.12 |
| 2 | 23.02 min. | 676 | 567 | 583 | 1.03 | −24.01 |
| 3 | 26.02 min. | 236 | 269 | 271 | 1.01 | −2.34 |
| 4 | 26.15 min. | 226 | 221 | 222 | 1.00 | −0.18 |
| 5 | 26.62 min. | 204 | 194 | 194 | 1.00 | −0.35 |
| 6 | 27.15 min. | 182 | 182 | 182 | 1.00 | −0.00 |
| 7 | 27.18 min. | 181 | 181 | 181 | 1.00 | 0.00 |
|  |  |  | 919 | 1393 | 1.52 |  |

A chlorine concentration of the composition A was measured to be at most 1.5 ppm.

(Formation of coating film)

A glass substrate was dipped in the hard coating composition (composition A) for one minute, and was taken up at a rate of 180 mm/min, and was heat-cured at 100° C. for 30 minutes in an electric furnace after removing a solvent at room temperature for 5 minutes.

The coating film thus obtained was transparent and had a thickness of 0.5 μm and a pencil hardness of 9H.

(Test for resistance to boiling water)

The substrate having the above coating film was dipped in boiling water and was boiled for 3 hours, but there was no change and the transparency of the coating film was maintained.

(Test for alkali resistance)

One drop of 5% aqueous NaOH was dropped on the coating film thus obtained and the film was allowed to stand overnight but there was no change.

(Test for acid resistance)

One drop of 5% aqueous $H_2SO_4$ was dropped on the coating film and the film was allowed to stand for 15 hours, but there was no change.

Example 2

200 Parts of ethanol was blended with 100 parts of the tetramethoxysilane oligomer obtained in Example 1 (synthesis of tetramethoxysilane oligomer), and 22 parts of 0.1N nitric acid was added and mixed therewith, and the resultant mixture was allowed to stand to obtain a colorless transparent homogeneous liquid-like hard coating composition. A coating film was formed by using the above obtained hard coating composition and was subjected to test for resistance to boiling water, test for alkali resistance and test for acid resistance, in the same manner as in Example 1, but there were no changes.

Also, the above obtained hard coating composition was not changed with regard to viscosity and had a viscosity of about 1 to 2 cps even after one month.

The coating film obtained was transparent and had a thickness of 0.5 μm and a pencil hardness of 9H.

Example 3

(Preparation of hard coating composition)

6.52 g of dechlorinated water, 0.31 g of aluminum (tris) acetylacetonate and 62.4 g of solvent "Solmix A-11" (ethanol 85.5%, IPA 1.1%, manufactured by Nihon Kaseihin K.K.) were added to 30.77 g of the tetramethoxysilane oligomer obtained in Example 1 (synthesis of tetramethoxysilane oligomer). The amount of water was 113% to an amount capable of theoretically completely hydrolysis-condensing the tetramethoxysilane oligomer. The above mixture was allowed to stand at room temperature for one day to obtain a colorless transparent homogeneous liquid-like aged material which is used as a hard coating composition.

(Measurement of reactive functional group amount)

The hard coating composition thus obtained was allowed to stand at 370° C. for 13 days under sealed condition, and thereafter the amount of reactive functional groups contained in a reactive ultrafine particulate silica in the aged material was determined by measuring methanol and ethanol in the solution by gas chromatography and measuring water in the solution by Karl Fischer's analysis. The analysis conditions were as follows:

Gas chromatography analysis condition:
Injection temperature: 180° C.
Column temperature: 180° C.
TCD (detector): 200° C.
Carrier gas: He 40 me/minute
Current electric current: 100 mA
Filler: Porapaq type Q As this result, in the solution, the methanol amount was 18.9% (0.591 mol), the ethanol amount was 57.1% (1.241 mol) and the water amount was 1.15% (0.0639 mol), and consequently the consumed water amount was determined to be 0.3041 mol. Accordingly, the amounts of the respective reactive functional groups contained in the reactive ultrafine particulate silica in the aged material were determined to be 13.2 mol % of a methoxy group, 40.3 mol% of an ethoxy group and 46.0 mol % of a silanol group.

Five days after the preparation of the above hard coating composition, a coating film was formed in the same manner as in Example 1 (formation of coating film). The coating film thus obtained was transparent and had a thickness of 0.3 μm and a pencil hardness of 9H.

The coating film thus obtained was subjected to test for resistance to boiling water, test for alkali resistance and test for acid resistance in the same manner as in Example 1, but there were no changes.

Also, the viscosity of the hard coating composition did not change even after 10 days, and was about 1 to 2 cps.

Example 4

66 Parts by weight of dechlorinated water was added to 100 parts by weight of the tetramethoxysilane oligomer obtained in Example 1 (synthesis of tetramethoxysilane oligomer). Thereafter, the mixture was adjusted to a pH of 2.0 by adding maleic acid. The resultant mixture was stirred at room temperature for 40 minutes to obtain a transparent homogeneous liquid-like condensate as an aged material. Thereafter, 2000 parts by weight of dechlorinated water was added thereto to obtain a hard coating composition. The hard coating composition thus obtained had a pH of 3.2.

The hard coating composition did not change with regard to a viscosity even after 3 days and had a viscosity of from 0.5 to 1 cps. A glass substrate was dipped in the hard coating composition for one minute, and was taken up at a rate of 180 mm/minute and was allowed to stand at room temperature for 5 minutes, and was then heat-cured at 150° C. for 30 minutes in an electric furnace.

The coating film thus obtained was transparent and had a thickness of 0.1 μm and a pencil hardness of 9H.

The coating thickness thus obtained was subjected to test for resistance to boiling water, test for alkali resistance and test for acid resistance in the same manner as in Example 1, but there were no changes.

Also, the hard coating composition did not change with regard to a viscosity even after 10 days, and had a viscosity of about 1 to 2 cps.

Example 5

24 Parts by weight of dechlorinated water was added to 100 parts by weight of the tetramethoxysilane oligomer obtained in Example 1 (synthesis of tetramethoxysilane oligomer). Thereafter, the resultant mixture was adjusted to a pH of 1.5 by adding maleic acid. The mixture was then stirred at room temperature for 5 minutes to obtain a transparent homogeneous liquid-like condensate as an aged material. The silica conversion concentration in the aged material was 41.9%. Thereafter, 205 parts by weight of dechlorinated water was added thereto to obtain a hard coating composition. The hard coating composition thus obtained had a pH of 1.9.

A coating film was formed by using this hard coating composition in the same manner as in Example 4. The coating film thus obtained was transparent and had a thickness of 0.5 μm and a pencil hardness of 9H.

The coating film thus obtained was subjected to test for resistance to boiling water, test for alkali resistance and test for acid resistance in the same manner as in Example 1, but there were no changes.

Example 6

40 Parts by weight of 1 wt % aqueous maleic acid prepared by blending maleic acid with dechlorinated water was added to 60 parts by weight of the tetramethoxysilane oligomer obtained in Example 1 (synthesis of tetramethoxysilane oligomer). The resultant mixture was stirred at room temperature for 30 minutes to obtain a transparent homogeneous liquid-like condensate as an aged material. The silica conversion concentration in the aged material was 31 wt %. Thereafter, 500 parts by weight of dechlorinated water was added to the resultant solution to obtain a colorless transparent homogeneous liquid-like hard coating composition. The silica conversion concentration in this hard coating composition was about 5.2%. The pH value of the hard coating composition was measured to be 1.9.

A coating film was formed by using this hard coating composition in the same manner as in Example 3. The coating film thus obtained was transparent and had a thickness of 0.5 μm and a pencil hardness of 9H.

The coating film was then subjected to test for resistance to boiling water, test for alkali resistance and test for acid resistance, but there were no changes.

Example 7

40.51 g of tetramethoxysilane obtained by reaction of metallic silicon and methanol, 48.35 g of ethanol, 0.31 g of maleic acid and 10.83 g of water were blended and aged to obtain a colorless transparent homogeneous liquid-like hard coating composition, and a coating film was formed by using this hard coating composition in the same manner as in Example 1 (formation of coating film).

The coating film thus obtained was transparent and had a thickness of 0.5 μm and a pencil hardness of 9H.

The coating film was then subjected to test for resistance to boiling water, test for acid resistance and test for alkali resistance in the same manner as in Example 1, but there were no changes.

The hard coating composition did not change with regard to a viscosity even after one month, and had a viscosity of about 1 to 2 cps.

Example 8

200 Parts by weight of ethanol, 2 parts by weight of maleic acid and 37.4 g of dechlorinated water were added to 100 parts by weight of the tetramethoxysilane oligomer obtained in Example 1 (synthesis of tetramethoxysilane oligomer). The amount of water was 200% to an amount capable of theoretically completely hydrolysis-condensing the tetramethoxysilane oligomer. After stirring, the resultant solution was allowed to stand at room temperature for 24 hours to obtain a colorless transparent homogeneous liquid-like aged material which is used as a hard coating composition.

A film coating was formed by using this hard coating composition in the same manner as in Example 3. The coating film thus obtained was transparent and had a thickness of 0.5 μm and a pencil hardness of 9H.

The coating film was then subjected to test for resistance to boiling water, test for alkali resistance and test for acid resistance in the same manner as in Example 1, but there were no changes.

Comparative Example 1

The tetramethoxysilane oligomer obtained in Example 1 (synthesis of tetramethoxysilane oligomer) was subjected to analysis by small angle X-ray scattering under the same conditions as in Example 1 (identification of fine particles).

Figure 9:
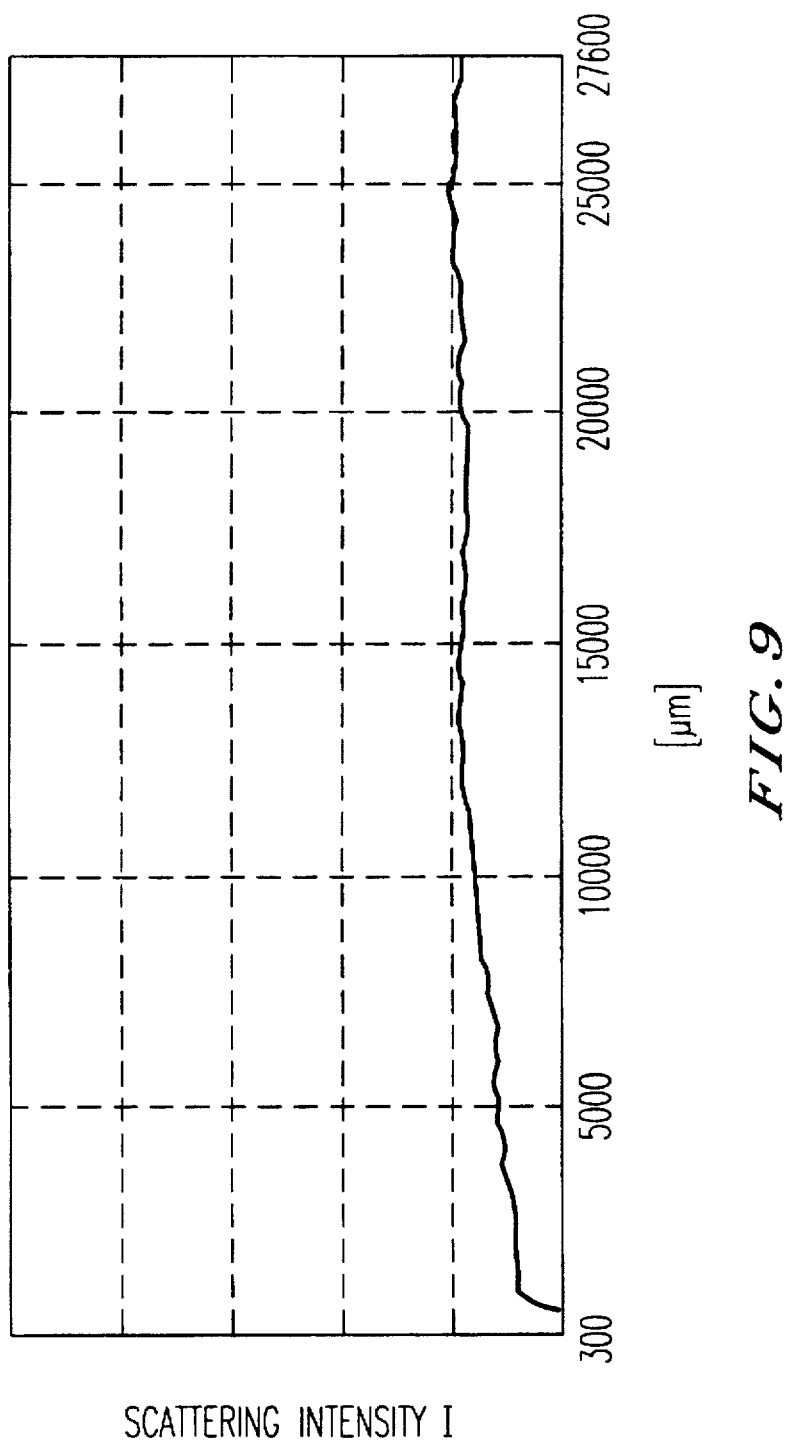
FIG. 9 shows measurement data of scattering intensity of a tetramethoxysilane oligomer obtained in Example 1 (synthesis of tetramethoxysilane oligomer).

FIG. 9 illustrates the measurement data of scattering intensity but as evident from this data, the structure of fine particles could not be identified.

Comparative Example 2

A hard coating composition was prepared by blending 38.80 g of commercially available ethyl silicate (tetraethoxysilane oligomer), 54.63 g of ethanol, 0.31 g of maleic acid and 6.26 g of water, and a coating film was formed by using this hard coating composition in the same manner as in Example 1 (formation of coating film). The coating film thus obtained had a thickness of 0.4 μm and a pencil hardness of 5H. The coating film thus obtained was then subjected to test for resistance to boiling water in the same manner as in Example 1, but the coating film was whitened. Also, the coating film was subjected to test for alkali resistance in the same manner as in Example 1, but the coating film was also whitened.

Comparative Example 3

A coating film was formed in the same manner as in Example 1 (formation of coating film) by using 55.4 g of tetraethoxysilane, 33.46 g of ethanol, 0.31 g of maleic acid and 10.83 g of water.

The coating film thus obtained had a thickness of 0.3 μm and a pencil hardness of 5H. The coating film was then subjected to test for resistance to boiling water in the same manner as in Example 1, but the coating film was whitened. Also, the coating film was subjected to test for alkali resistance in the same manner as in Example 1, but the coating film was also whitened.

INDUSTRIAL APPLICABILITY

As mentioned above, the reactive ultrafine particulate silica of the present invention and the suspension of the present invention provide an excellent hard coating composition having a satisfactory storage stability, which can provide a coating film having a high hardness, a satisfactory flexibility and various excellent film properties such as acid resistance, resistance to boiling water and alkali resistance.

We claim:

1. A reactive ultrafine particulate silica having a radius of gyration of at most 10 Å;

having a hydroxyl group in an amount of at least 0.8 time mole to an alkoxy group;

being obtained by adding water to tetramethoxysilane in an amount capable of effecting from 100% to 200% hydrolysis condensation of tetramethoxysilane.

2. The reactive ultrafine particulate silica according to claim 1, characterized by having a molecular weight of from 1,000 to 3,000.

3. The reactive ultrafine particulate silica according to claim 1 or 2, characterized in that a pH value is at most 3 at the time of hydrolysis.

4. A suspension obtained by aging a blending solution obtained by blending tetramethoxysilane with water in an amount capable of effecting from 100% to 200% hydrolysis condensation of tetramethoxysilane.

5. A suspension characterized by containing a reactive ultrafine particulate silica having a radius of gyration of at most 10 Å;

having a hydroxyl group in an amount of at least 0.8 time mole to an alkoxy group; and being obtained by adding water to tetramethoxysilane in an amount capable of effecting from 100% to 200% hydrolysis condensation of tetramethoxysilane.

6. The suspension according to any one of claims 4 or 5, characterized in that a silica concentration is at least 36 wt %.

7. The suspension according to any one of claims 4 or 5, characterized in that a viscosity is from 0.5 to 10 cps.

8. The suspension according to any one of claims 4 or 5, characterized by being colorless transparent and not causing Tyndall phenomenon.

9. The suspension according to any one of claims 4 or 5, characterized by being film-formable for at least 10 months at room temperature under sealed condition.

10. The suspension according to any one of claims 4 or 5, characterized in that a chlorine concentration is at most 2 ppm.

11. The suspension according to any one of claims 4 or 5, characterized in that a pH value is from 1 to 5.

12. A hard coating composition obtained by blending tetramethoxysilane with water in an amount capable of effecting from 100% to 200% hydrolysis condensation of tetramethoxysilane.

13. The hard coating composition according to claim 12, characterized in that a pH value is from 1 to 5.

14. The hard coating composition according to claim 12, characterized by being obtained by aging a blending solution obtained by blending tetramethoxysilane with water.

15. The hard coating composition according to claim 12, characterized in that a chlorine concentration is at most 2 ppm.

16. A hard coating having a pencil hardness of at least 9H, which is obtained by coat the hard coating composition as defined in claim 12.

17. A hard coating composition comprising a suspension characterized by containing a reactive ultrafine particulate silica having a radius of gyration of at most 10 Å;

having a hydroxyl group in an amount of at least 0.8 time mole to an alkoxy group; and being obtained by adding water to tetramethoxysilane in an amount capable of effecting from 100% to 200% hydrolysis condensation of tetramethoxysilane.

18. A hard coating having a pencil hardness of at least 9H, which is obtained by coating a hard coat composition comprising a hydrolysis condensation solution of an alkoxysilane.

19. A coated article obtained by applying to an article, a hard coating composition obtained by a blending tetramethoxysilane with water, in an amount capable of effecting from 100–200% hydrolysis condensation of tetramethoxysilane.

20. A method of coating an article, comprising applying to the surface of an article, a coating composition obtained by blending tetramethoxysilane with water, in an amount capable of effecting from 100–200% hydrolysis condensation of tetramethoxysilane.

* * * * *